June 29, 1926.

A. NYMAN ET AL 1,590,478

ELECTRICAL SYSTEM

Filed June 25, 1921

WITNESSES:

INVENTORS
Alexander Nyman and
Edward B. Newill.
BY
Wesley G. Carr
ATTORNEY

June 29, 1926.

A. NYMAN ET AL 1,590,478

ELECTRICAL SYSTEM

Filed June 25, 1921   3 Sheets-Sheet 3

WITNESSES:

INVENTORS
Alexander Nyman, and
Edward B. Newill.
BY

ATTORNEY

Patented June 29, 1926.

1,590,478

UNITED STATES PATENT OFFICE.

ALEXANDER NYMAN AND EDWARD B. NEWILL, OF WILKINSBURG, PENNSYLVANIA, ASSIGNORS TO WESTINGHOUSE ELECTRIC & MANUFACTURING COMPANY, A CORPORATION OF PENNSYLVANIA.

ELECTRICAL SYSTEM.

Application filed June 25, 1921. Serial No. 480,443.

Our invention relates to electrical systems and particularly to such systems as constitute isolated plants known as farm-lighting systems.

One object of our invention is to provide a system that is automatically controlled by the circuit connections of a consuming device.

A second object of our invention is to provide an arrangement whereby an internal-combustion engine is automatically started upon the partial completion of the generator load circuit and whereby the starting mechanism is rendered ineffective after a predetermined period.

Another object of our invention is to provide an arrangement whereby the ignition system of an internal-combustion engine is initially controlled in accordance with the circuit connections of a consuming device and is controlled in accordance with the current traversing the generator circuit after the voltage of the latter has attained a predetermined value.

Briefly, our invention consists of an arrangement whereby a starting motor is rendered operative for a predetermined period to start an internal-combustion engine upon the closing of a switch in circuit with the consuming device in the load circuit of a generator that is operatively connected to the engine. A storage battery, that is in series with the several consuming devices, supplies energy to the starting motor and to the ignition system. When the generator voltage reaches a predetermined value, the circuit closes, and the operation of the system is controlled in accordance with the value of the current traversing the generator circuit. The ignition circuit of the engine is de-energized when the current traversing the generator circuit falls to a predetermined value.

In the accompanying drawings.

Figure 1:
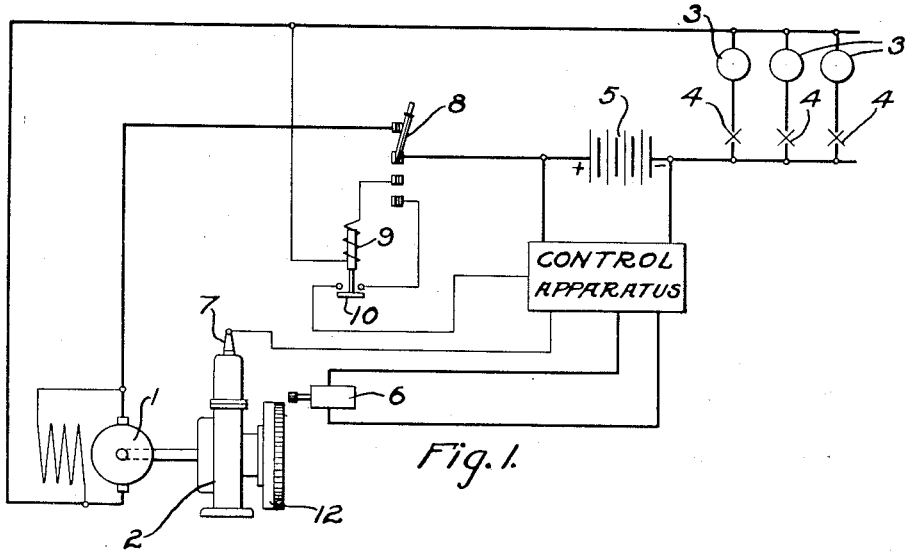
Figure 1 is a diagrammatic view of the main circuits and apparatus embodying our invention.

Referring particularly to Fig. 1, a generator 1, which is driven by an internal-combustion engine 2, supplies energy to a plurality of consuming devices 3 which may be, for example, electric lamps. The circuit connections of each of the lamps 3 are controlled by a suitable switch 4. A battery 5, which is in series with the lamps 3, supplies energy to a starting motor 6 and to the ignition system of the gas engine, a single spark plug 7 being illustrated.

A main switch 8 controls the load circuit of the generator and also the circuit of the actuating coil 9 of a relay 10. In the interest of simplicity, the switch is illustrated as a manually operable switch. In practice, the switch is electro-responsive. The closing of the relay 10 initiates the operation of various controlling devices not shown but indicated diagrammatically and designated by the legend "control apparatus".

It may be assumed that the system is at rest and that the main switch 8 occupies its lower or starting position. To effect the operation of the system, it is only necessary to close one of the switches 4 in circuit with one of the lamps. The closing of the switch 4 completes a circuit for the actuating coil 9 of relay 10 which extends from the positive side of battery 5, through switch 8, coil 9, lamp 3 and switch 4 to the other side of the battery.

The closing of relay 10 effects the operation of the control apparatus to close the circuit of the starting motor 6 and to close the ignition circuit including the spark plug 7. The starting motor 6, which may be provided with a mechanism such, for example, as that of the well-known Bendix type, is automatically connected to the fly-wheel 12 of the engine 2. In case a starting device of the character indicated above is employed, the startitng motor is automatically disconnected from the engine upon the starting of the latter. The circuit of the starting motor is controlled in such manner that it is energized only during a predetermined period, regardless of the starting of the engine.

This arrangement prevents the depletion of the battery in case the engine fails to start, for any reason. When the engine starts under its own power and is operating at substantially its normal speed, the switch 8 may be actuated to its upper or running position to complete the generator circuit. The relay 10 opens to de-energize the various controlling switches. The system may be brought to rest by the opening of switch 8.

Figure 2:
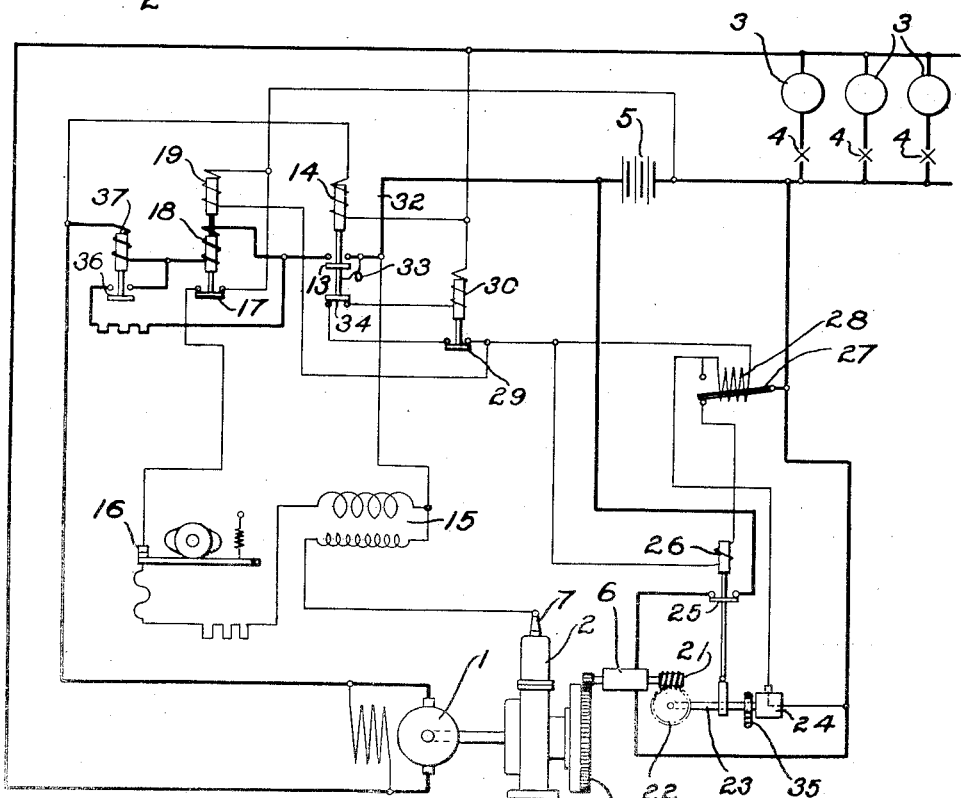
Fig. 2 is a diagrammatic view of a complete system corresponding to Fig. 1.

Reference may now be had to Fig. 2 in which the details of a system corresponding closely to that of Fig. 1 are illustrated. Similar numerals are employed to designate parts corresponding to those of Fig. 1. The generator circuit is controlled by a main switch 13 having an actuating coil 14. The ignition circuit of the engine 2 comprises an induction coil 15 and an interrupter 16, the circuit of which is controlled by a switch 17 having a series actuating coil 18 and a shunt actuating coil 19.

The starting motor 6, which corresponds in character to the starting motor 6 of Fig. 1, is provided with a worm-gear mechanism 21 comprising a worm gear 22 that is connected, by means of a shaft 23, to a commutator device 24 which performs the function of a limit switch. The position of the shaft 23 and, accordingly, the relation of the worm gear 22 to the worm wheel on the motor shaft is controlled in accordance with the position of a switch 25 that is interlocked to the shaft 23.

The circuit of the actuating coil 26 of starting switch 25 is controlled by a thermostat comprising a bimetallic strip 27 and a heating coil 28. A relay 29 has an actuating coil 30, the circuit of which is controlled by any of the several switches 4 that are in circuit with the respective lamps 3 when the system is at rest.

It may be assumed that the system is at rest and that the several relays and switches occupy their respective normal or illustrated positions. It may be assumed further that the starting motor 6 is disconnected from the flywheel 12 and that the worm gear 22 and its connected mechanism are disconnected from the starting motor 6.

To initiate the operation of the system, it is only necessary to close one of the switches 4. A circuit for actuating coil 30 of relay 29, which is closed thereby, extends from the positive terminal of the battery through conductor 32, flexible conductor 33, interlock 34 of line switch 13, coil 30, lamp 3 and switch 4 to the negative terminal of the battery. The relay 29 completes a parallel circuit for actuating coil 19 of switch 17 which is sufficiently obvious to render its tracing unnecessary. The switch 17 closes to complete the ignition circuit for the engine 2. The relay 29 also completes a circuit for the actuating coil 26 of starting switch 25. This circuit extends from interlock 34, which is connected to the positive terminal of the battery, through a relay 29, coil 26 and bimetallic strip 27 to the negative terminal of the battery. The starting switch 25 closes and, at the same time, actuates the worm gear 22 into engagement with the coacting worm gear. The starting motor is thereupon automatically connected to the flywheel 12 to rotate the latter.

The starting motor 6 is automatically disengaged from the engine when the latter starts. The motor continues to rotate, however, regardless of the starting of the engine until the commutator 24 reaches a predetermined position, whereupon it completes a circuit for the heating coil 28 of the thermostat. The bimetallic strip 27 then operates to open the circuit of actuating coil 26 of starting switch 25 and the latter opens to disconnect the worm-gear mechanism and to open the circuit of the motor. The commutator 24 is returned to its original or normal position by a spiral spring 35. The bimetallic strip 27 remains in its upper position until the relay 29 opens.

When the generator voltage reaches a predetermined value, the coil 14 is energized to close main switch 13 and to open interlock 34 that is connected thereto. The closing of the switch 13 connects the battery and the lamp or lamps 3, as the case may be, in circuit with the generator. The opening of interlock 34 opens the circuit of actuating coil 30 of relay 29, and the latter opens the circuit of heating coil 28 and of coil 19 of switch 17. The bimetallic strip 27 returns to its lower position when it has cooled sufficiently.

The switch 17 remains closed, however, by reason of the energization of series coil 18. Since the coil 18 must be effective when traversed by the current supplied to a single lamp, such current having approximately the value of one-tenth ampere, and since the full-load current of the plant may attain a value of thirty amperes, for example, it is advisable to provide a shunt circuit for the coil 18 when the current reaches a predetermined value. A switch 36, having a series actuating coil 37, completes a shunt circuit for the coil 18 when the current traversing the generator reaches any desired predetermined value. The number of shunting relays may be such as desired to provide for the range of current values obtaining in the particular system employed.

It will be noted that, upon the closing of main switch 13, the control of the ignition circuit through switch 17 has been transferred from coil 19, which is energized in accordance with the voltage of the battery, to the control of the coil 18, which is responsive to the value of the current traversing the load circuit of the generator. Accordingly, it is only necessary to open such switches 4 as have been closed in order to bring the system to rest. When the consuming devices are excluded from the load circuit, substantially no current traverses the latter and the coil 18 is sufficiently de-energized to permit the switch 17 to open. The ignition circuit is de-energized and the gas engine 2 comes to rest. The system is then in readiness for the succeeding operation which is identical with that described above.

Figure 3:
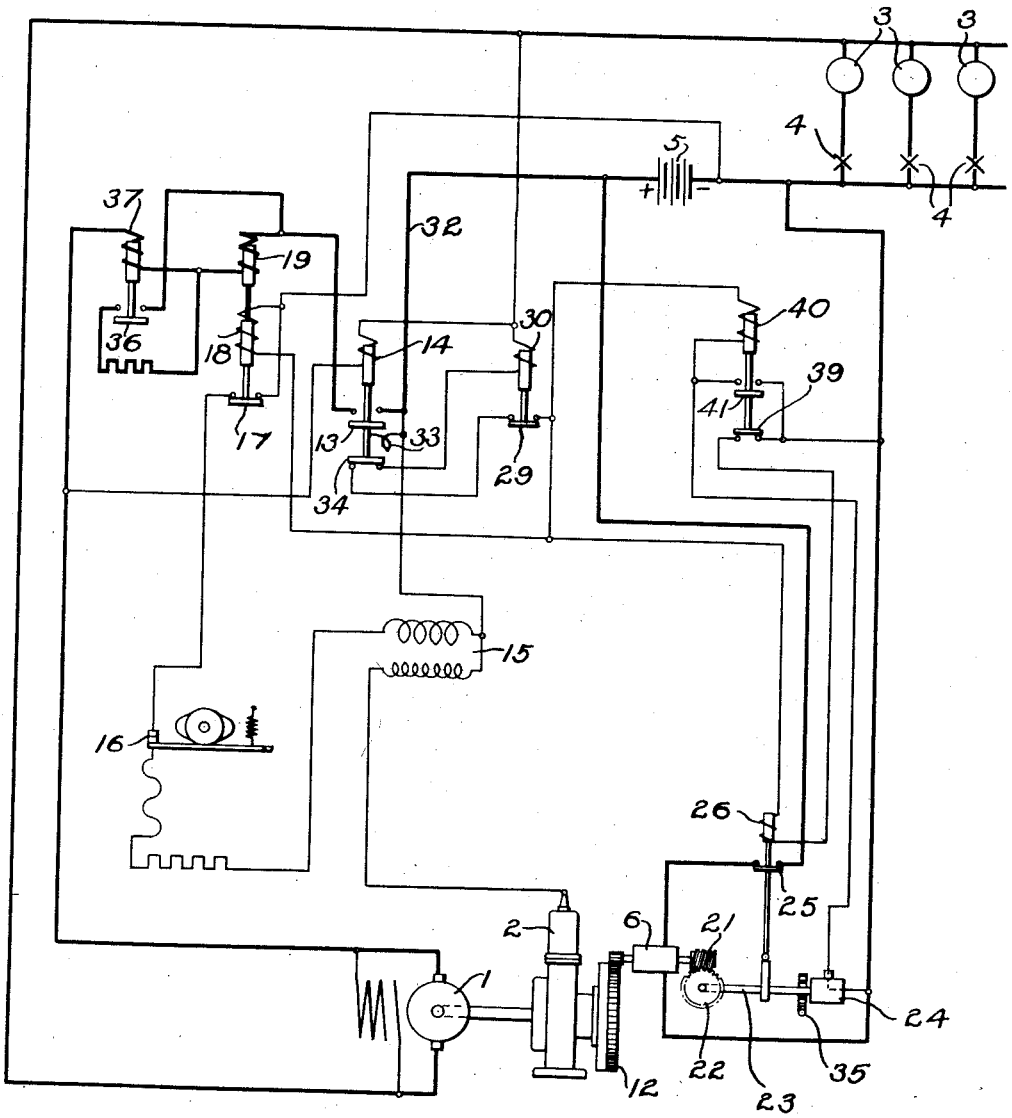
Fig. 3 is a view, similar to Fig. 2, of a modification.

Referring to Fig. 3, the system illustrated therein corresponds closely to that of Fig. 2. The principal difference resides in the substitution of a relay for the thermostatic device. Since the arrangement of the system is substantially identical in other respects with that of Fig. 2, the description of the operation and arrangement of the system will be confined to the means for controlling the starting motor 6.

The circuit of actuating coil 26 of starting switch 25 is controlled by a relay 39 having an actuating coil 40. When the relay 39 occupies its normal or lower position, and one or more of the switches 4 is closed, a circuit is completed for actuating coil 30 that is identical with that described in the system of Fig. 2. The relay 29 closes to complete the ignition circuit of the engine 2 and to complete a circuit for actuating coil 26 of starting switch 25.

The latter circuit extends from the positive terminal of the battery through conductor 32, interlock 34, relay 29, coil 26 and relay 39 to the negative terminal of the battery. The starting mechanism operates to start the engine in the usual manner, and the commutating device, which is operatively connected to the starting motor, operates at a predetermined point in its path of movement to complete a circuit for actuating coil 40 of relay 39.

The relay 39 opens to de-energize coil 26, thereby permitting the opening of starting switch 25 to render the starting mechanism inoperative. An upper contact member 41 of the relay 39 completes a holding circuit for the coil 40, and the relay 39 is maintained in its open position so long as the relay 29 remains closed. The relay 29 opens upon the closing of line switch 13, as previously described in connection with the system of Fig. 2. The relay 39 is then in position for the succeeding starting operation.

Figure 4:
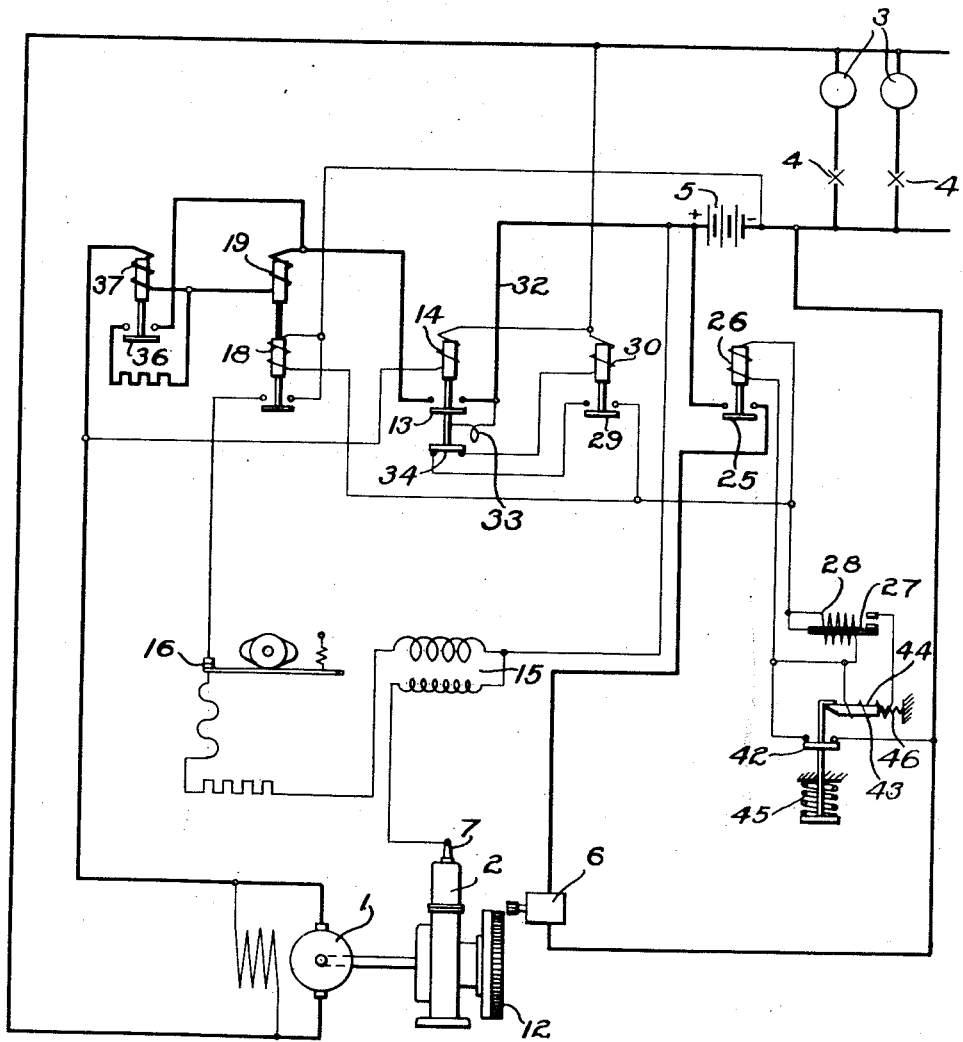
Fig. 4 is a view, similar to Fig. 2, of a second modification.

Reference may now be had to Fig. 4 in which a second modification of our invention is illustrated. The system is similar to those previously described, with the exception of the means for imposing a time limit in the operation of the starting motor. Accordingly, the description of the present system will be limited to the latter arrangement.

The operation of the system is initiated, as described in the systems of Figs. 2 and 3, by the closing of a circuit for one of the lamps 3. The actuating coil 30 of relay 29 is energized by a circuit which extends from the positive terminal of the battery through conductor 32, flexible conductor 33, interlock 34 of line switch 13, coil 30, lamp 3 and switch 4 to the negative terminal of the battery.

The relay 29 thereupon closes to complete a circuit which extends from the positive terminal of the battery, conductor 32, flexible conductor 33, interlock 34, relay 29, actuating coil 26 of relay 25 and a normally closed push-button switch 42 to the negative terminal of the battery. The heating coil 28 for the bimetallic strip 27 is also connected in parallel relation to the coil 26.

The starting motor 6, the circuit of which has been closed by the switch 25, then operates in a well-known manner to crank the gas engine 2. If the engine starts within a predetermined period, the bimetallic strip 27 does not operate to vary the electrical connections of the motor.

If, however, the engine does not start within the time limit of operation of the bimetallic strip 27, the latter closes the contact members controlled thereby to complete a circuit for a coil 43 which controls a latch member 44 for the push-button switch 42. The latch member thereupon releases the switch and the latter is actuated to its open position by a spring 45. The opening of switch 42 opens the circuit of actuating coil 26 of starting switch 25 and the latter opens to break the motor circuit. The circuit of the starting motor cannot thereafter be completed until the bimetallic strip 27 has cooled to such degree that the circuit of coil 43 has been opened and a spring 46 has actuated the latch member 44 to its illustrated position to retain the push-button switch in its closed position.

The advantages of a system constructed in accordance with our invention comprise, among others, the automatic operation of the system upon the closing of a single switch for controlling a lamp or other consuming device in the load circuit. The system may be brought to rest by the opening of the switch which initiates the operation of the system by reason of the arrangement for shifting the control of the ignition system from the means responsive to the voltage of the battery to the means controlled in accordance with the value of the current traversing the generator circuit.

It will be noted that we provide, also, protective means for the storage battery whereby the motor is disconnected therefrom at the end of a predetermined period regardless of the starting of the engine. It is necessary, upon the occurrence of a failure of the engine to start, for the operator to investigate and correct such conditions as may exist to prevent starting of the engine.

The above and other advantages will be appreciated by those skilled in the art to which our invention appertains.

We claim as our invention:

1. In an electrical system, the combination with a generator, an engine operatively connected thereto and a starting device for said engine that is normally disconnected therefrom, of means operable upon the closing of a switch associated with the load circuit of said generator to successively effect the connection of said starting device to said engine and the operation of the starting device, establish operating conditions for said engine, render said starting device inoperative regardless of the starting of said engine and close the load circuit of the generator.

2. In an electrical system, the combination with a generator, an engine operatively connected thereto and a starting device for said engine that is normally disconnected therefrom, of means operable upon the closing of a switch associated with the load circuit of said generator to successively effect the operative connection of said engine and said starting device and the operation of the latter, establish operating conditions for said engine, render said starting device inoperative at the end of a predetermined period regardless of the starting of said engine and close the load circuit of the generator when the generator voltage reaches a predetermined value.

In testimony whereof, we have hereunto subscribed our names this 16th day of June, 1921.

ALEXANDER NYMAN.
EDWARD B. NEWILL.